April 18, 1961  S. W. LARSON  2,980,876
CONTROL SETTER
Filed Sept. 1, 1959  2 Sheets-Sheet 1
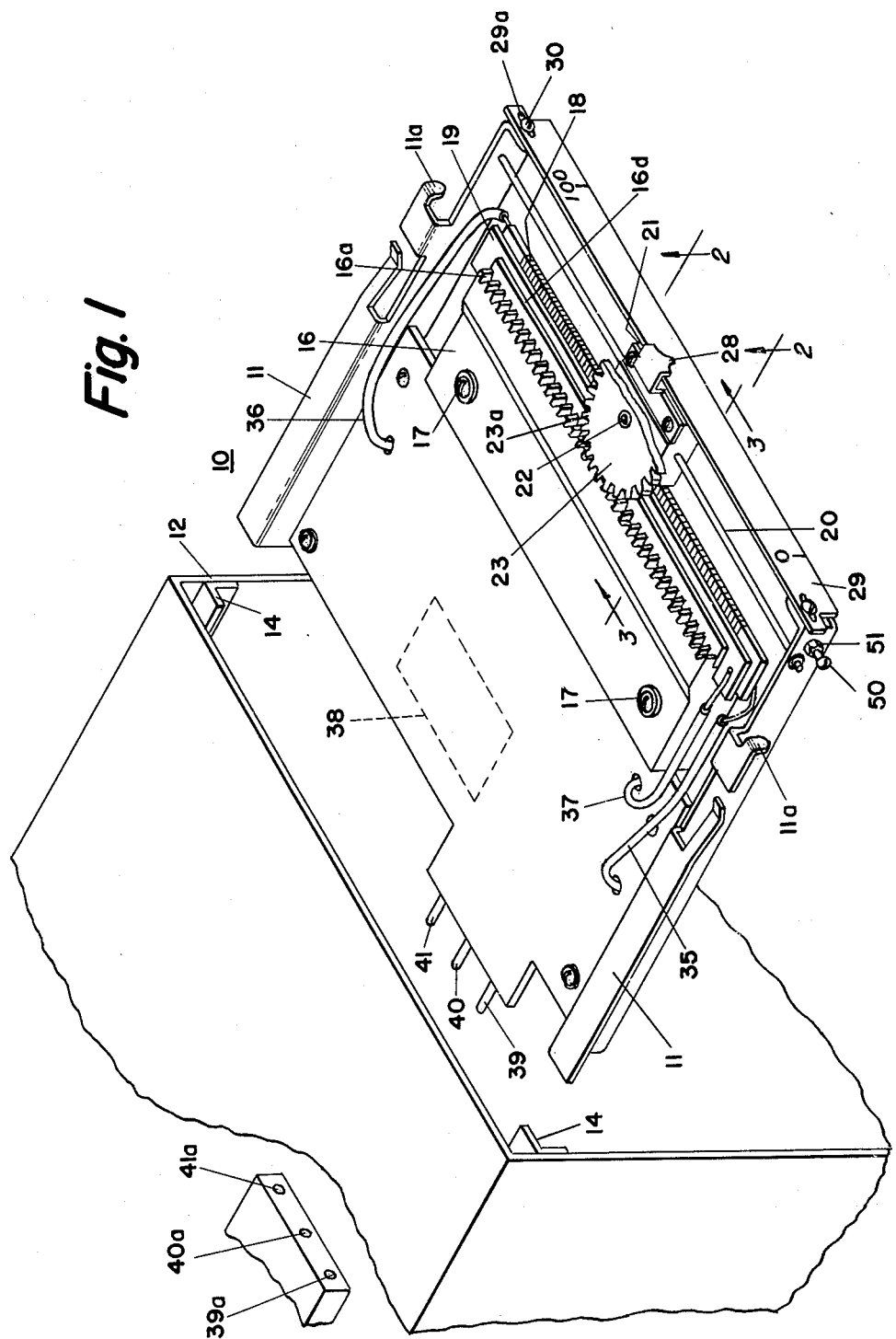

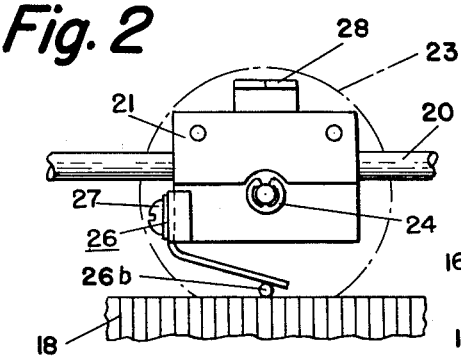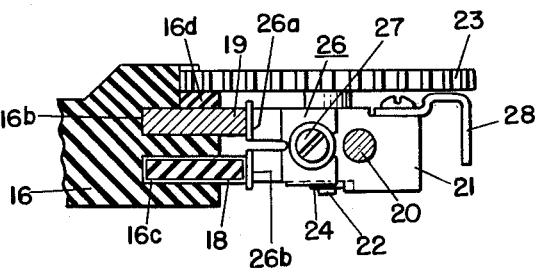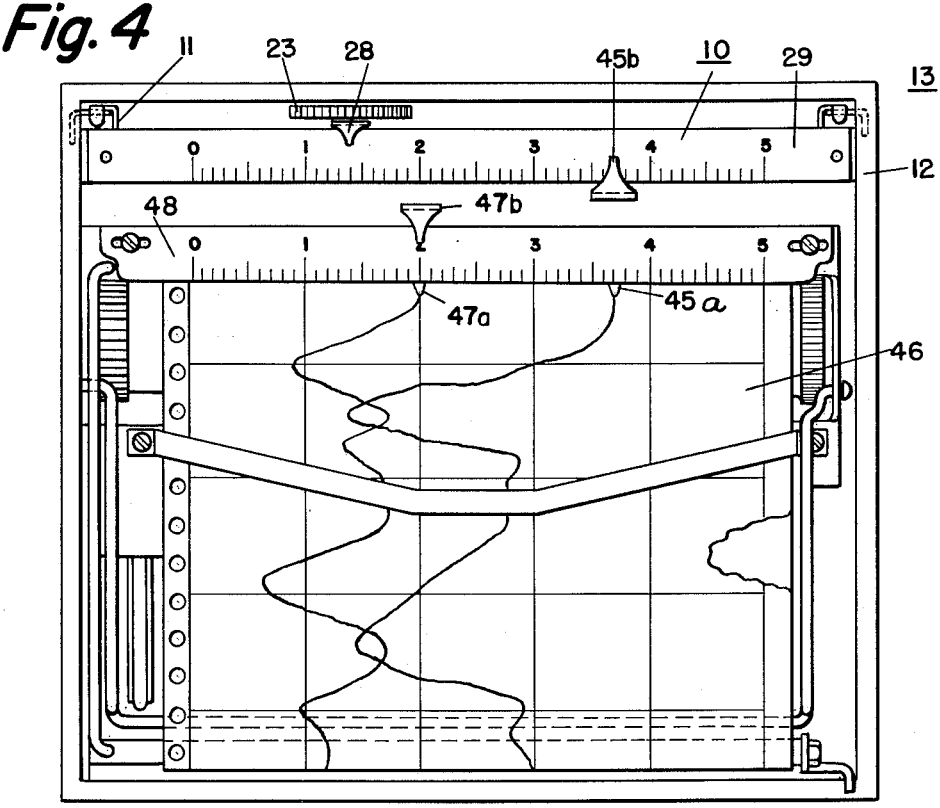

United States Patent Office 2,980,876
Patented Apr. 18, 1961

2,980,876

CONTROL SETTER

Siegfried W. Larson, Havertown, Pa., assignor to Leeds and Northrup Company, Philadelphia, Pa., a corporation of Pennsylvania Filed Sept. 1, 1959, Ser. No. 837,412

8 Claims. (Cl. 338—183)

This invention relates to control setter devices for setting electrical control apparatus or the like and has for an object the provision of a compact control setter device including means for simultaneously providing rapid and accurate adjustment.

Control setter devices are frequently utilized in connection with exhibiting instruments of the type employing a strip chart together with an associated pen-index assembly for recording and indicating magnitudes of conditions under measurement. It is particularly desirable that the scale of the control setter be positioned adjacent the pen-index assembly for ease in comparison of the set point with the measured variable. It is likewise particularly desirable that the control setter device be capable of rapid and accurate adjustment for the setting operation. Various arrangements have been utilized in the past where control setter devices have included separate means for coarse and fine adjustment or have been provided with single means enabling all coarse adjustment or all fine adjustment. These devices have been subject to the disadvantages that the adjustment is either slow or relatively inaccurate.

In carrying out the present invention in one form, there is provided a control setter device of improved and compact construction which is adapted for positioning closely adjacent the pen-index assembly of a recording instrument and which device includes means for simultaneously providing rapid and accurate adjustment of the device.

More specifically, the present invention provides a device for setting electrical control apparatus and includes rack means supported in fixed position and gear means adapted to cooperate with the rack means and movable therealong. A slidewire is supported in fixed relation with the rack means and extends lengthwise thereof. A track extends parallel to the rack means and the slidewire and is supported in fixed relation thereto. A carrier is disposed on the track and supports a shaft which extends through the center of the gear means and about which center the gear means is adapted to rotate. The carrier also provides a support for contact structure which is engageable with the slidewire. A scale is disposed parallel to the slidewire and supported in fixed relation thereto, and an indicator is supported on the carrier for cooperation with the scale. The gear means is relatively movable with respect to the rack means to effect movement of the contact structure along the slidewire a distance equal to one-half the distance moved by operating means applying a force tangentially to the periphery of the gear means at a point diametrically opposite the point of engagement between said rack means and said gear means and in a direction parallel to the rack means and scale.

The control setter device is adapted for support on a tray which is slideable into and out of the recording instrument housing to facilitate the substitution of one setter device for another. The control setter device may be used for adjusting the set point of a controller for a single variable or it may be used for determining the ratio between two variables through a ratio controller, depending upon the electrical network cooperating with the slidewire and the contact structure of the setter device.

For further objects and advantages of the invention and for a more detailed description thereof, reference is to be had to the following description taken in conjunction with the accompanying drawings in which:

Fig. 1 is a perspective view of a control setter device embodying the present invention;

Fig. 2 is a bottom plan view of a portion of the device looking along the lines 2—2 in Fig. 1;

Fig. 3 is a side elevation of a portion of the device looking along the lines 3—3 in Fig. 1; and Fig. 4 is a front elevation of a recording instrument including the control setter device of Fig. 1.

Refering to Fig. 1, the control setter device 10 includes a supporting frame illustrated as a tray 11 having outwardly extending flanges adapted to be slideably received within a housing 12 of a recording instrument 13 such as illustrated in Fig. 4. As may be seen in Fig. 1, the side walls of the housing 12 are provided with angle brackets 14 which provide surfaces on which the flanges of the tray may slide and for supporting the tray 11. The outer end of each of the flanges of tray 11 is provided with a down-turned end 11a which serves as a stop to limit the movement of the setter device 10 into the housing 12.

Supported on the tray 11 is a rack means 16 or equivalent adapted to be secured to the tray 11 in fixed position as by screws 17. The rack means preferably is molded from a suitable thermo-setting resin such as a phenolic resin sold under the trademark Durez #1544 and has formed in the front edge thereof a row of teeth 16a. Beneath the teeth 16a, the rack means 16 is provided with slots 16b and 16c, Fig. 3, which are adapted to receive and support in parallel relation to the rack teeth 16a, a slidewire 18 and a conductor bar 19. The tray 11 also supports a track member illustrated in the form of a rod 20 which extends parallel to the slidewire and the rack teeth 16a. The track is adapted slideably to support a carrier 21 which also is formed from a suitable insulating material such as linen base Bakelite. The carrier 21 has a hole therethrough which provides a support for rotation therein of a shouldered stud shaft 22 to which there is affixed a gear means 23 or equivalent. The stud shaft 22 extends through the carrier 21 as may be seen in Fig. 3, and the lower end of the stud shaft 22 is provided with a groove to receive a snap washer 24 to retain the shaft in place. The gear means 23 is provided with projecting structure in the form of teeth 23a which are adapted to engage teeth 16a of the rack means 16.

As may be seen in Figs. 2 and 3, the carrier 21 also supports electrical contact structure 26. As best seen in Fig. 3, the contact structure 26 is of the bridging type and includes a contact 26a which is adapted to engage the conductor bar 19 and a contact 26b which is adapted to engage the slidewire 18. The bridging contact structure 26 is secured to the carrier 21 by a suitable means such as a screw 27. The carrier 21 also provides support for an index or pointer 28 which is adapted to cooperate with a suitable scale 29 carried on the front end of the tray 11, Fig. 1. The scale extends parallel to the track 20 which supports the carrier 21. As may be seen in Figs. 1 and 3, the rack means 16 is provided with a lip 16d which extends beneath the row of teeth 16a and prevents the gear 23 from engaging the conductor bar 19. The scale 29 is provided with elongated holes 29a through which extend the mounting screws 30 for securing the scale to the tray 11. The elongated holes 29a permit the scale 29 to be adjusted lengthwise in order to align the zero of the scale with the zero end of the slide-wire 18. It will also be noted that there has also been provided a screw 50 with a lock nut 51 which comprise an adjustable stop for the carriage so that the electrical contact structure 26 may be set to the zero postion along the slidewire.

As may be seen in Fig. 4, the gear means 23 extends from the forward end of the instrument 13 and is adapted for manual adjustment by an operator. The operator applies a force tangentially to the gear wheel at a position adjacent the pointer 28 and this force causes the gear wheel to move along the rack means 16. This movement causes the carrier 21 to move along the track 29 and likewise causes relative movement between the contact structure 26 and the slidewire 18. The gear and rack construction provides for simultaneous rapid and accurate adjustment of the slidewire contact by reason of the fact that the gear may be rapidly rolled along the rack yet their mating frictional surfaces avoid slippage and the contact movement along the slidewire is only one-half the distance moved by operating means applied tangentially to the frontal periphery of the gear means 23.

The conductor bar 19 and cooperating contact 26a eliminate the necessity of attaching a flexible conductor to the contact 26b. The slidewire 18 and the conductor bar 19 are connected by way of conductors 35—37 to a suitable electrical network schematically illustrated by the rectangle 38 and to the contacts 39—41 at the rear of the tray 11. The electrical components of the network 38 will vary depending upon the use for which the control setter device 10 is employed. It may be used as a control point setter in a circuit such for example as shown in Figs. 3 and 4 (page 275) of an article (pages 269–279) entitled "An Integrated Miniature Electronic Control System" by E. J. Cranch and W. B. Alden which appeared in a publication by the American Institute of Electrical Engineers, March 1959, identified at T–113 and entitled "3rd National Conference" "Conference on Analog and Digital Instrumentation." The slidewire 18 shown in Fig. 1 corresponds to the slidewire identified as $R_4$ in Figs. 3 and 4 of the publication. The control setter device 10 may also be used as a ratio setter where one variable is made to follow the fluctuations of another variable, both fluctuations being in the same direction. The electrical components for this modification of circuit 38 may be as illustrated in Fig. 7 of the aforesaid publication. The slidewire in Fig. 7 which corresponds to slidewire 18 of applicant's invention is identified as $R_1$. The electrical circuitry per se performs no part of the present invention. Such electrical circuitry forms a part of the subject matter of application Serial No. 839,788, filed September 14, 1959 by Cranch et al.

Referring to Fig. 4, the control setter device 10 is illustrated as maintained in a housing 12 with a recording instrument 13. The recorder instrument 13 may be of the type disclosed in the aforesaid publication and also disclosed and claimed in copending applications Serial No. 837,415, filed September 1, 1959 by Johnson et al. and Serial No. 839,788. Recording instrument 13 as illustrated in Fig. 4 includes means for simultaneously indicating and recording two variables. The pen-index combination including a pen 45a and a pointer 45b are movable along the scale 29 and a chart 46 for simultaneously indicating and recording the magnitude of a controlled variable, the set point of which is determined by the adjustment of gear means 23 relative to rack means 16, Fig. 1, which positions the indicator 28 along the scale 29. The recording instrument 13 is provided with a second pen-index combination including a pen 47a and a pointer 47b, the latter cooperating with a scale 48 on the recorder. In this particular instance, the second variable is not controlled; however, if it is desired, to make the second variable follow the first variable, the control setter device 10 may be of the ratio type as aforementioned. As may be seen in Fig. 1, the plug-in contacts 39—41 of the control setter device 10 are adapted to be received in mating contacts 39a—41a which are disposed within the housing 12 and which are connected with other electrical components. It is understood that the contacts illustrated are by way of example and that additional contacts may be utilized depending upon the circuit requirements.

While the foregoing describes a preferred embodiment of the invention, it is to be understood that other modifications thereof may be made within the scope of the appended claims.

What is claimed is:

1. A device for setting electrical control apparatus comprising rack means supported in fixed position, gear means adapted to cooperate with said rack means and movable therealong, slidewire means supported in fixed relation with said rack means and extending lengthwise thereof, a track extending parallel to said rack means and said slidewire means and supported in fixed relation therewith, a carrier disposed on said track, a shaft carried by said carrier and extending through the center of said gear means, contact structure carried by said carrier and engageable with said slidewire means, a scale disposed parallel to said slidewire means and supported in fixed relation therewith, and an indicator supported on said carrier for cooperation with said scale, said gear means being relatively movable to said rack means to effect movement of said contact structure along said slidewire means a distance equal to one-half the distance moved by operating means applying a force tangentially to the periphery of said gear means and parallel to said rack and scale.

2. A device according to claim 1 including a conductor bar supported along the side of said slidewire means and spaced therefrom, said contact structure carried by said carrier engaging both said slidewire means and said conductor bar.

3. A device according to claim 1 wherein said rack means is molded from electrical insulating material and includes slot means extending lengthwise thereof for supporting said slidewire means.

4. A device according to claim 3 wherein said slot means includes a pair of spaced slots one of which supports a conductor bar.

5. A device for setting electrical control apparatus comprising tray means slideable into and out of a housing, a rack means supported in fixed position on said tray means, gear means adapted to cooperate with said rack means and movable therealong, slidewire means supported in fixed relation with said rack means and extending lengthwise thereof, a track extending parallel to said rack means and said slidewire means and supported on said tray, a carrier disposed on said track, means rotatably to support said gear means on said carrier for movement of said carrier by rotation of said gear means, contact structure carried by said carrier and engageable with said slidewire means, a scale disposed parallel to said slidewire means and supported on said tray, and an indicator supported on said carrier for cooperation with said scale, said gear means overhanging the edge of said tray and being movable relative to said rack means to effect said movement of said carrier along said slidewire means a distance equal to one-half the distance moved by operating means applying force tangentially to the periphery of said gear means at a point diametrically opposite the point of engagement between said gear means and said rack means and parallel to said rack and scale.

6. A device according to claim 1 wherein said rack means and said gear means are provided with cooperating tooth structure.

7. A device according to claim 1 wherein said rack means and said gear means are provided with mating friction surfaces, said gear means being adapted to roll along said friction surface of said rack means without slipping.

8. A device for setting electrical control apparatus comprising tray means slideable into and out of a housing, a rack means supported in fixed position on said tray means, gear means adapted to cooperate with said rack means and movable therealong, slidewire means supported in fixed relation with said rack means and extending lengthwise thereof, a track extending parallel to said rack means and said slidewire means and supported on said tray, a circuit panel supported on said tray, plug-in contact members supported by said circuit panel and electrically connected with said slidewire means, a carrier disposed on said track, means rotatably to support said gear means on said carrier for movement of said carrier by rotation of said gear means, contact structure carried by said carrier and engageable with said slidewire means, a scale disposed parallel to said slidewire means and supported on said tray, and an indicator supported on said carrier for cooperation with said scale, said gear means overhanging the edge of said tray and being movable relative to said rack means to effect said movement of said carrier along said slidewire means a distance equal to one-half the distance moved by operating means applying force tangentially to the periphery of said gear means at a point diametrically opposite the point of engagement between said gear means and said rack means and parallel to said rack and scale.

References Cited in the file of this patent
UNITED STATES PATENTS

| | | |
|---|---|---|
| 2,178,314 | Saxe | Oct. 31, 1939 |
| 2,288,043 | Stanton | June 30, 1942 |
| 2,526,196 | Caldwell | Oct. 17, 1950 |